United States Patent [19]

Nilsson

[11] 4,252,872

[45] Feb. 24, 1981

[54] GRANULATED LEAD OXIDES WITH TEFLON

[75] Inventor: Ove Nilsson, Nol, Sweden

[73] Assignee: ESB Incorporated, Philadelphia, Pa.

[21] Appl. No.: 121,374

[22] Filed: Feb. 14, 1980

[51] Int. Cl.³ .............................................. H01M 4/16
[52] U.S. Cl. ..................................... 429/140; 429/228; 429/238; 429/217; 29/623.1
[58] Field of Search ............................... 429/225–228, 429/232, 238, 140, 212, 217; 141/10, 11; 29/623.1

[56] References Cited

U.S. PATENT DOCUMENTS

| 571,143 | 11/1896 | Woodward | 429/228 |
|---|---|---|---|
| 3,647,546 | 3/1972 | Cording | 429/140 |
| 4,011,370 | 3/1977 | Eckerbom | 429/140 |
| 4,025,701 | 5/1977 | Sundberg | 429/140 |
| 4,071,946 | 2/1978 | Nilsson | 429/217 X |
| 4,110,519 | 8/1978 | Nilsson | 429/217 |

FOREIGN PATENT DOCUMENTS 891,537  3/1962  United Kingdom .

*Primary Examiner*—Anthony Skapars
*Attorney, Agent, or Firm*—R. J. Kenny; F. J. Mulligan

[57] ABSTRACT

An improvement in the production of tube electrodes for lead storage batteries comprising mixing a small amount (0.1 to 3 weight percent) of polytetrafluoroethylene (PTFE) with lead powder, the mixture is heated and shear stresses are applied thereto sufficient to convert substantially all of the PTFE in the mixture to fibrous form and to form a non-powdery dough. The dough is then granulated and the doughy granules about $100\mu$ to $500\mu$ in major dimension are used for filling tube elctrodes of a lead-acid storage battery.

3 Claims, No Drawings

GRANULATED LEAD OXIDES WITH TEFLON

BACKGROUND OF THE INVENTION

The present invention concerns the production of lead granules for the dry filling of tube electrodes for storage batteries.

Tube electrodes for lead storage batteries are known and have been described, for example, in U.S. Pat. No. 2,747,077. They are constructed from a grid of lead or a lead alloy, which grid contains a so-called top frame, from which extends a number of conducting bars or rods, generally of the same lead composition as the grid. Each rod is surrounded by active material. The active material of fully charged positive electrodes consists of lead dioxide. In the prior production of the electrodes, the tube sheaths are set on the grid which is then turned upsidedown on the top frame and thereafter the active material, which is provided in the form of so-called lead powder, is charged into the sheaths. The lead powder used in filling the sheaths is lead powder of varying degrees of oxidation and generally from about 65 up to 100% oxidation. The filling proceeded as follows: the electrode with the sheaths set about the rods was set up in a cassette which at the top is provided with a small-sized funnel. Thereupon, the cassette was vibrated and the lead power which was to be conveyed to the electrode was filled down in the funnel and through the funnel into the space between the sheath and the rod. Finally, the electrode was closed with a bottom strip which covers all the tube apertures.

The dusting of the lead powder which arises in connection with the production of tube electrodes according to the above process is very inconvenient and causes great problems. It is therefore very important that dusting be avoided or be reduced or a minimum. In order to reduce or eliminate dusting, various filling methods which utilize wet mass mixtures have been tried. For example, a mass of the lead dust and water and/or other additions in small amounts may be prepared. This mass is then conveyed to an extruder or some similar feeding device and is pressed into the tube sheaths. Such a procedure is described, for example, in Swedish patent application No. 7,408,864. While this wet process reduces dusting, it produces other problems such as the formation of an irregular filling of the electrodes and increased amounts of lead in the waste water.

Polytetrafluoroethylene (PTFE) is also used for dust control purposes not connected with the production of electrodes. In such a process, up to two percent in weight of PTFE are added to the powder characterized by excessive dusting. PTFE is present either as a dry powder or in suspension. The mixture is then heated to a temperature preferably just under 100° C. and is processed. Thereby the PTFE changes from a powder to fibers. This process and the dust-free, free-flowing powder product thereof are described in U.S. Pat. Nos. 3,838,064 and 3,838m092.

In connection with the production of lead accumulator electrodes in the dry powder process described above, various additions to the lead have been attempted for different purposes including suppression of dusting. The use of PTFE in a powder filling process has been described in U.S. Pat. No. 4,071,946.

OBJECTS AND SUMMARY OF THE INVENTION

It is an object of this invention to avoid or alleviate the above-noted problems of the prior art.

It is also an object of this invention to provide a method of manufacturing a dry lead granulated mixture suitable for the filling of tube electrodes which eliminates or substantially reduces the problems of dusting and which provides granular material suitable for filling of tube electrodes which will give satisfactory service in tubular battery usage.

Thus, the present invention is a method for the production of lead granules suitable for the dry filling of tube electrodes for electrical accumulators comprising providing a mixture of lead powder which normally is at least 6% oxidized and from 0.1 to 3 percent by weight of polytetrafluoroethylene, heating the mixture and applying shear stresses to said powder mixture sufficient to convert said polytetrafluoroethylene into fibrous form and to produce a non-powdery dough and thereafter granulating said dough to granules having major dimensions in the range of about 100 to 500 microns ($\mu$).

In other aspects, the present invention also provides the dry lead granule mixture produced by this method and a method of filling tube sheaths in lead storage batteries utilizing the dry lead granular mixture produced by the invention. In contrast to free-flowing, nondusting powder produced by relatively mild working of a—dusting powder—PTFE powder mixture—to form loose agglomerates, the dough granules of the present invention are large, well-defined particles having smooth surfaces. Lead oxide powder used to make the dough has a particle size in the range of 1 to $20\mu$ e.g., about $18\mu$. Dough particles are at least about $100\mu$ in major dimension, and, more advantageously at least about $250\mu$ in major dimension.

Surprisingly, it has now been discovered that the application of PTFE in connection with lead dust for tube electrodes does not have a negative effect on the duration or life of the tube electrodes. In other respects, too, no unfavorable effects on the qualities of the electrodes have been observed.

DESCRIPTION OF THE PREFERRED EMBODIMENTS

The lead power utilized in the dry powder mixture of this invention can be any of the conventional lead powders normally used in the dry powder production of tube electrodes for lead storage batteries having varying degrees of oxidation, generally from about 65 to about 100%. These lead powders have an average particle size of about 0.0003 cm.

Polytetrafluoroethylene powder (PTFE) is mixed with the lead powder in an amount of from 0.1 to 3, preferably from about 0.25 to 0.7 percent by weight.

The mixture is then heated to an elevated temperature and the heated mixture is then treated by applying shear stresses thereto so that the PTFE is converted into fibers in the mixture. The shear stresses may be applied by any suitable means such as, for example, by disposing the heated powder mixture between the walls of a rotating drum and a rotating cylinder for a time sufficient to form the PTFE into fibrous form by application of shear stresses and to form a dough (a soft coherent mass). Other apparatuses such as sigma blade mixers can also be used for this purpose. Furthermore, mixing and dough formation can be combined in one operation. Granulation of the dough is accomplished in any known fashion for example by use of grinding, grating, attrition etc. One specific means for granulation is disclosed in U.S. Pat. No. 3,963,517 which describes pressing a paste through a foraminous body and allowing thus produced granules to free-fall through a heated, gaseous drying medium. The same process can be used in the present invention with the modification that a heated gaseous drying medium is not necessary. Alternatively commercially available means such as a Paterson-Kelly Twin Shell Blender with an intensifier bar can act as a granulator for the dough.

The resulting granules are suitable for use in the filling of tube electrodes by the dry process set forth above with an elimination of the dusting problem.

The invention is more explicitly described in connection with the following Example which is to be considered as illustrative of the present invention. It should be understood, however, that the invention is not limited to the specific details of the Example.

Examples

EXAMPLE I

Lead powder, oxidized to an extent of about 70% and characterized by an average particle size of about 0.0003 cm and further characterized by severe dusting when disturbed, is mixed on a double cone blender (with an intensifier bar) with 0.5% PTFE powder having a particle size of about 0.0425 cm and sold by E. I. duPont de Nemours Company, Inc. under the trade designation Teflon 6A. The mixed powders are then heated to about 100° C. to 115° C. and subjected to shear in a sigma blade mixer until the powder character of the mixture is lost and a co-adherent stiff dough is formed. The dough is taken out of the sigma blade mixer and allowed to cool to room temperature. Lumps of the dough are fed into a meat grinder fitted with a perforated disc. The diameter of the holes in the perforated disc was 1 mm. By pressing the dough through these holes, the granules were formed. The filling properties of the granules were excellent and extra vibrations of the tubes were not necessary. The filled tubes are characterized by excellent performance in tube-type lead acid storage batteries. If desired, bulking agents and other additives known to be useful in the lead-acid storage battery art can be included in the doughforming mixture.

EXAMPLE II

A dough prepared as in Example I was rubbed on a 16 mesh screen and granules with nearly the same good filling properties and the same excellent performance in tube-type lead acid batteries as detailed in Example I were formed.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method for the production of a tube-type electrode for a lead-acid storage battery comprising applying heat and shear forces to a mixture of lead powder which normally is at least 65% oxidized and from 0.1 to 3 percent by weight of polytetrafluoroethylene to convert said polytetrafluoroethylene into fibrous form and produce a polytetrafluoroethylene - lead powder dough, mechanically granulating said dough to form granules having major dimensions of about 100 to about 500$\mu$ and, thereafter positioning said granules in the space between an insulative tube and an electroconductive spine of a tube-electrode structure to provide material convertible in-situ to a polytetrafluoroethylene fiber-bound, battery active mass.

2. The method of claim 1 wherein the amount of polytetrafluoroethylene employed is about 0.25% to about 0.7% by weight.

3. A tube-type electrode made by the process of claim 1.

* * * * *